US009817968B2

United States Patent
Farina et al.

(10) Patent No.: US 9,817,968 B2
(45) Date of Patent: Nov. 14, 2017

(54) SECURE CONNECTION FOR A REMOTE DEVICE THROUGH A MOBILE APPLICATION

(71) Applicant: Unisys Corporation, Blue Bell, PA (US)

(72) Inventors: Ralph Farina, Downington, PA (US); Ted Hinaman, Malvern, PA (US); Robert A. Johnson, Malvern, PA (US); Steven Rajcan, Malvern, PA (US); James Trocki, Malvern, PA (US); Mark Vallevand, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 850 days.

(21) Appl. No.: 13/664,507

(22) Filed: Oct. 31, 2012

(65) Prior Publication Data
US 2014/0123268 A1 May 1, 2014

(51) Int. Cl.
*H04L 29/06* (2006.01)
*G06F 21/53* (2013.01)
*G06F 9/00* (2006.01)
*G06F 15/16* (2006.01)
*G06F 17/00* (2006.01)
*G06F 7/04* (2006.01)

(52) U.S. Cl.
CPC .......... *G06F 21/53* (2013.01); *H04L 63/0272* (2013.01); *H04L 63/104* (2013.01); *H04L 63/164* (2013.01); *H04L 63/168* (2013.01)

(58) Field of Classification Search
None
See application file for complete search history.

(56) References Cited

U.S. PATENT DOCUMENTS

| 7,891,001 B1* | 2/2011 | Greenawalt et al. ........... 726/22 |
| 2002/0067725 A1* | 6/2002 | Oguchi ............... H04L 12/4641 370/390 |
| 2010/0192216 A1* | 7/2010 | Komatsu ........................ 726/12 |
| 2012/0084544 A1* | 4/2012 | Farina et al. ..................... 713/2 |
| 2013/0007740 A1* | 1/2013 | Kikuchi .............. H04L 41/5012 718/1 |
| 2013/0041931 A1* | 2/2013 | Brand ........................... 709/203 |
| 2013/0066978 A1* | 3/2013 | Bentley ............... H04L 12/1822 709/206 |

* cited by examiner

*Primary Examiner* — Eric Chen
(74) *Attorney, Agent, or Firm* — Robert P. Marley

(57) ABSTRACT

Virtual machines in a network may be isolated by encrypting transmissions between the virtual machines with keys possessed only by an intended recipient. Within a network, the virtual machines may be logically organized into a number of community-of-interest (COI) groups. Each COI may use an encryption key to secure communications within the COI, such that only other virtual machines in the COI may decrypt the message. Remote devices may gain access to virtual machines in a network through a virtual device relay. The virtual device relay receives data from the remote device, such as a tablet or cellular phone, and forwards the data to one of the virtual machines, when the virtual device relay shares a COI with the destination virtual machine.

20 Claims, 10 Drawing Sheets

SECURE CONNECTION FOR A REMOTE DEVICE THROUGH A MOBILE APPLICATION

CLAIM TO PRIORITY

The present application is a continuation-in-part of U.S. application Ser. No. 13/105,130, filed May 5, 2011 and entitled "Methods and Systems for Managing Concurrent Unsecured and Cryptographically Secure Communications Across Unsecured Networks," which issued as U.S. Pat. No. 9,525,666 on Dec. 20, 2016, and which is a continuation-in-part of U.S. application Ser. No. 11/714,590, filed Mar. 6, 2007 and entitled "Securing and Partitioning Data-In-Motion Using a Community-Of-Interest Key," which is now abandoned and which is a continuation-in-part of U.S. application Ser. No. 11/339,974, filed Jan. 26, 2006 and entitled "Integrated Multi-Level Security System," which is now abandoned and which claims the benefit of U.S. Application Ser. No. 60/648,531, filed Jan. 31, 2005 and entitled "Distributed Security on Multiple Independent Networks Using Secure 'Parsing' Technology,".

The present application is additionally a continuation-in-part of U.S. application Ser. No. 13/105,141, filed May 11, 2011 and entitled "Methods and Systems for Providing and Controlling Cryptographic Secure Communications Across Unsecured Networks," currently pending, and which claims the benefit of both: (a) U.S. Application Ser. No. 61/389,535, filed Oct. 4, 2010 and entitled "System and Method for Providing a Stealth Secure Virtual Terminal,"; and (b) U.S. Application Ser. No. 61/389,511, filed Oct. 4, 2010 and entitled "System and Method for Providing a USB Stick-Based Thin Client,".

The present application is additionally a continuation-in-part of U.S. application Ser. No. 13/105,154, filed May 5, 2011 and entitled "Methods and Systems for Providing and Controlling Cryptographically Secure Communications Across Unsecured Networks Between a Secure Virtual Terminal and a Remote System." which is currently pending and claims the benefit of both: (a) U.S. Application Ser. No. 61/389,535, filed Oct. 4, 2010 and entitled "System and Method for Providing a Stealth Secure Virtual Terminal,"; and (b) U.S. Application Ser. No. 61/389,511, filed Oct. 4, 2010 and entitled "System and Method for Providing a USB Stick-Based Thin Client,".

FIELD OF THE DISCLOSURE

The instant disclosure relates to network devices. More specifically, this disclosure relates to securing virtual machines executing on network devices.

BACKGROUND

Virtual machines running in a cloud are not well protected from other machines in the cloud, or from devices with physical access to the cloud. For example, virtual machines executing in a cloud may receive communications from any device in the cloud, whether a public cloud or a private cloud. Further, data transmitted by the virtual machine in the cloud may be intercepted by unintended recipients.

In a conventional solution, a network may include a plurality of virtual or hardware servers hosting virtual machines leased by tenants. The virtual machines may start and stop based on demand for the tenant's services. Because the virtual machines are frequently starting and stopping there are no dedicated resources for the tenant. This reduces the cost for the tenant, because resources are only used when they are needed. Thus, the tenant only pays for resources as they are used. However, because there is no leased hardware for the tenant, the tenant's virtual machines may start on any one of a number of server systems in the network.

For example, a tenant may be a customer owning one or more virtual machines executing within the network. Because the virtual machines execute on shared hardware with other virtual machines belonging to other tenants, the transmission to and/or from the virtual machine may be intercepted by another tenant. Conventional solutions for isolating hardware of one tenant from hardware of another tenant are not useful for improving security, because any tenant's virtual machine may execute on hardware with another tenant's virtual machines.

Furthermore, remote devices, not a part of the network hosting the plurality of servers, may need access to the virtual machines or other devices on the shared network. Conventionally, the remote device may connect to the network through a tunnel, such as a virtual private network (VPN). The tunnel encrypts data between the network and the remote device. However, because the network does not belong to a single tenant, but is shared by multiple tenants, such a solution would allow the remote device access to virtual machines and other devices on the network that may be owned or leased by another tenant.

SUMMARY

Remote devices may access hosts on a shared network through a virtual device relay hosted on the shared network. When a remote device, such as cellular phone, smart phone or a tablet, attempts to access a shared network, a virtual machine executing a virtual device relay may start. The virtual device relay may receive communications from the remote device and provide access to devices on the shared network. When the virtual device relay starts, authorization information received from the remote device may be used to determine one or more community-of-interests to assign to the virtual device relay. The remote device may then have access to other devices in the assigned communities-of-interest through the virtual device relay.

According to one embodiment, a system includes a virtual private network (VPN) appliance coupled to a shared network. The system also includes a remote device in communication with the VPN appliance. The system further includes a virtual device relay in communication with the VPN appliance and the shared network.

According to another embodiment, an apparatus includes a virtual device broker configured to execute virtual channel connections. The virtual channel connections include a virtual device relay and a router in communication with the virtual device relay.

According to yet another embodiment, a method includes receiving an incoming connection from a remote device. The method also includes starting a virtual device broker on a shared network executing a virtual device relay. The method further includes receiving data from the remote device. The method also includes relaying the data from the virtual device relay to a device on the shared network.

According to one embodiment, a method includes receiving, at a virtual device relay, data from a remote device. The method also includes forwarding the data to a host, when the virtual device relay and the host share a community-of-interest.

According to another embodiment, a computer program includes a computer-readable medium having code to receive, at a virtual device relay, data from a remote device. The medium also includes code to forward the data to a host, when the virtual device relay and the host share a community-of-interest.

According a further embodiment, an apparatus includes a memory and a processor coupled to the memory. The processor is configured to receive, at a virtual device relay, data from a remote device. The processor also is configured to forward the data to a host, when the virtual device relay and the host share a community-of-interest.

According to one embodiment, a method includes initiating, by a remote device, a secure connection to a router executing in a virtual machine of a server. The method also includes transmitting, through the secure connection, data to the router destined for another virtual host on a shared network within the server.

According to another embodiment, a computer program product includes a computer-readable medium having code to initiate a secure connection to a router executing in a virtual machine of a server. The medium also includes code to transmit data to the router destined for a host on a shared network within the server.

According a further embodiment, an apparatus includes a memory and a processor coupled to the memory. The processor is configured to initiate a secure connection to a router executing in a virtual machine of a server. The processor is also configured to transmit data to the router destined for a host on a shared network within the server.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
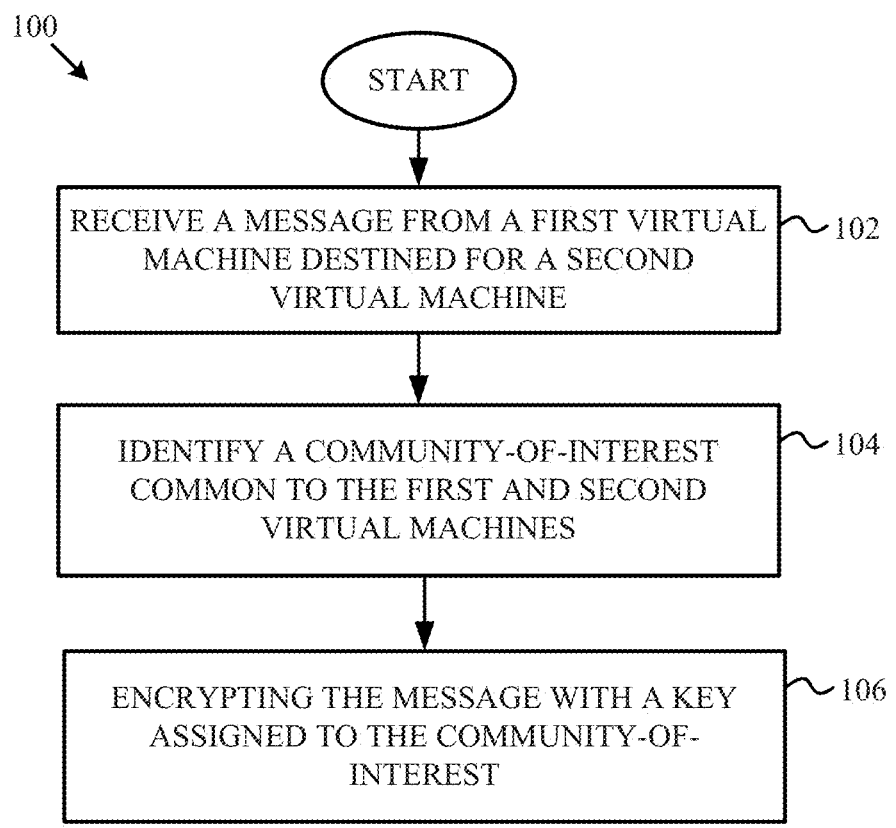
FIG. 1 is a flow chart illustrating a method for cryptographically isolating virtual machines according to one embodiment of the disclosure.

FIG. 1 is a flow chart illustrating a method for cryptographically isolating virtual machines according to one embodiment of the disclosure. A method 100 begins at block 102 with receiving a message from a first virtual machine destined for a second virtual machine. The second virtual machine may be hosted by the same server or a different server from the first virtual machine. The message may include information, such as application-layer data. The message may be formatted as packetized data according to, for example, a transmission control protocol/internet protocol (TCP/IP).

At block 104, a common community-of-interest is identified between the first and the second virtual machines. Virtual machines executing on one or more servers may each be assigned one or more communities-of-interest (COI). The communities-of-interest may allow an administrator to create logical organizations of virtual machines. A community-of-interest may be defined by a role of the virtual machines in the COL For example, an administrative COI may be created for virtual machines handling administrative tasks. A community-of-interest may also be defined by the capabilities of the virtual machines in the COI. For example, a high-performance COI may be created for virtual machines having more than one processor available for calculations. The communities-of-interest may further be used to separate communications between virtual machines, even when the virtual machines of different communities-of-interest share a physical network connection and/or physical hardware.

A first virtual machine may identify whether the second virtual machine is a member of at least one community-of-interest with the first virtual machine by consulting a look-up table and/or querying the second virtual machine. When the first and the second virtual machine share several communities-of-interest, a priority scheme may be used to select a particular one of the communities-of-interest for transmitting the message. For example, a client community-of-interest group may be preferred over an administrative community-of-interest group. Further, a community-of-interest may also be prioritized based on other members of the community-of-interest, such as when the first virtual machine does not desire certain virtual machines other than the second virtual machine to be able to receive the message. For example, when multiple communities-of-interest are shared between the first and the second virtual machine, the community-of-interest with the least number of members may be prioritized for communications to limit potential eavesdroppers.

At block 106, the message is encrypted with a key corresponding to the community-of-interest. A session key may be created for transmitting the message from the first virtual machine to the second virtual machine. The session key may be encrypted with a key corresponding to the community-of-interest and transmitted from the first virtual machine to the second virtual machine. Only other virtual machines that are a member of the community-of-interest may decode the session key. The message received at block 102 may be transmitted with this session key, which may be only known to the second virtual machine. Thus, communications between the first and the second virtual machine may be cryptographically isolated from other virtual machines, particularly virtual machines owned by other tenants in the network.

Figure 2:
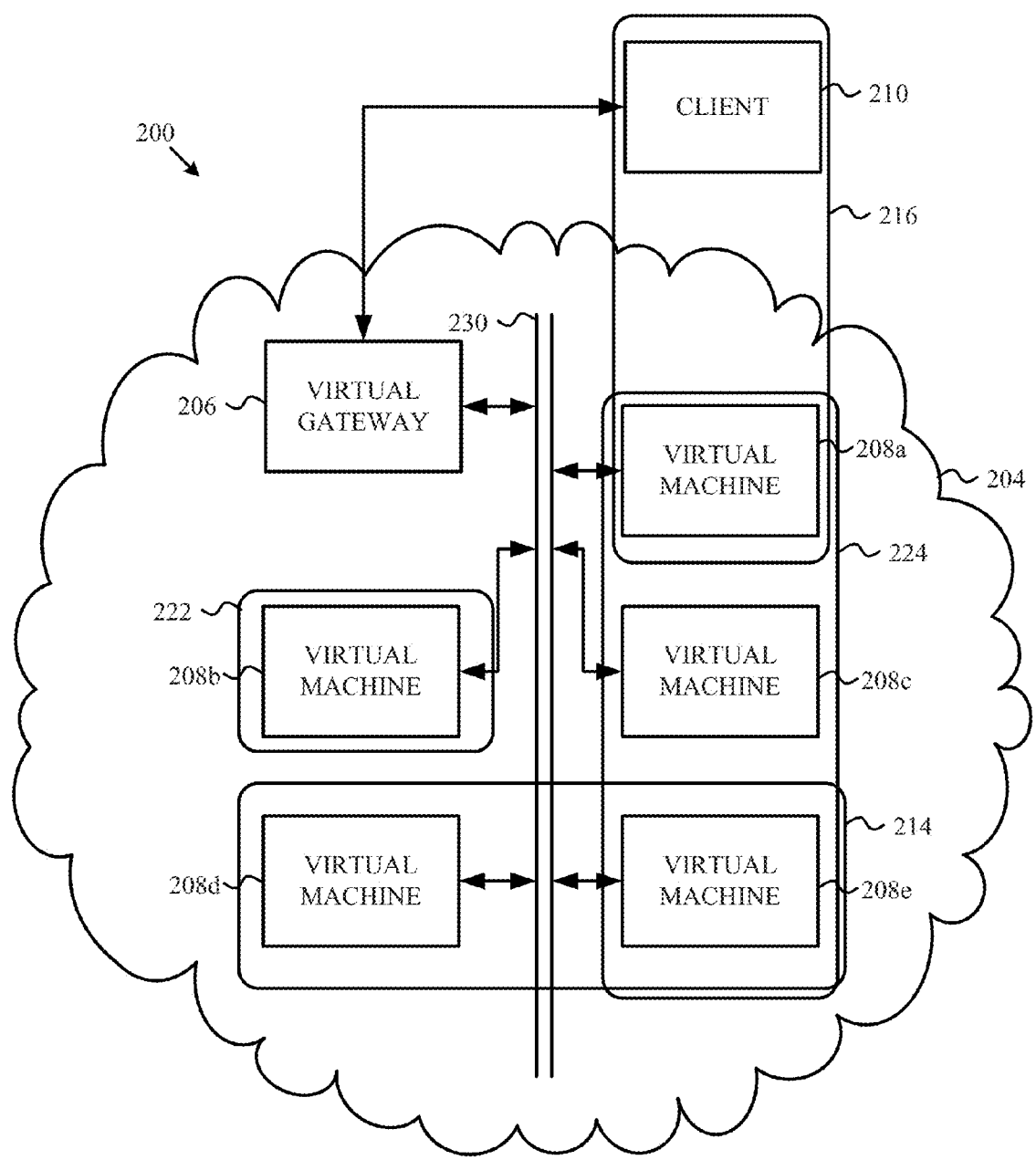
FIG. 2 is a block diagram illustrating an encrypted enclave of virtual machines organized into communities-of-interest according to one embodiment of the disclosure.

FIG. 2 is a block diagram illustrating an encrypted enclave of virtual machines organized into communities-of-interest according to one embodiment of the disclosure. A network 200 may include a network bus 230 serving an enclave 204 and shared between virtual machines, hosted on either virtual or hardware servers. The bus 230 may couple virtual machines 208a-e within the enclave 204, which may be a private cloud, a public cloud, or a combination of private and public clouds. Each of the virtual machines 208a-e may communicate through encrypted communications carried on the bus 230. Further, the bus 230 may be private to prevent access by unwanted guests. A virtual gateway 206 may be coupled to the bus 230 to provide communications from the enclave 204 to external devices, such as the client 210 and/or other public networks, such as the Internet. The client 210 may be a remote device, such as a personal computer or a mobile device. The client 210 may be connected to the virtual gateway 206 through a secured tunnel, such that communications between the client 210 and the virtual gateway 206 are encrypted similar to the encrypted communications on the bus 230. The client 210 may also be connected to the virtual gateway 206 through an unencrypted communications link, in which the communications with the client 210 are encrypted by the virtual gateway 206 for transmission on the bus 230 and communications from the bus 230 are decrypted for transmission to the client 210.

The virtual machines 208a-e may be assigned to one or more communities-of-interest (COI). For example, the virtual machines 208a, 208c, and 208e may be assigned to COI 224. In another example, the virtual machines 208d and 208e may be assigned to COI 214. Communities-of-interest may also include only a single virtual machine, such as when other virtual machines assigned to the COI have been stopped. For example, COI 222 may include the virtual machine 208b. Further, communities-of-interest may also include devices located outside of the enclave 204. For example, COI 216 may include the virtual machine 208a and the client 210.

A virtual machine 208e may be instructed to transmit a message to the virtual machine 208a. For example, software executing on the virtual machine 208e may request data from a database server executing on the virtual machine 208a. When the virtual machine 208e receives the message destined for the virtual machine 208a, the virtual machine 208e, or a device hosting the virtual machine 208e, may identify a community-of-interest in common between the virtual machine 208e and the virtual machine 208a. The COI 224 may be identified as a community-of-interest shared between the virtual machine 208e and the virtual machine 208a. Thus, a key corresponding to the COI 224 may be used to encrypt the message, which is then transmitted to the virtual machine 208a. The key may be a session key previously transmitted to the virtual machine 208a, after being generated by the virtual machine 208e and encrypted with a. key for the COI 224.

Additional details regarding communities-of-interest and the provisioning of devices within a community-of-interest may be found in U.S. patent application Ser. No. 13/547,138 (TN562), Ser. No. 13/547,143 (TN563), Ser. No. 13/547,160 (TN564), and Ser. No. 13/547,148 (TN565), which are hereby incorporated by reference in their entirety.

Figure 3:
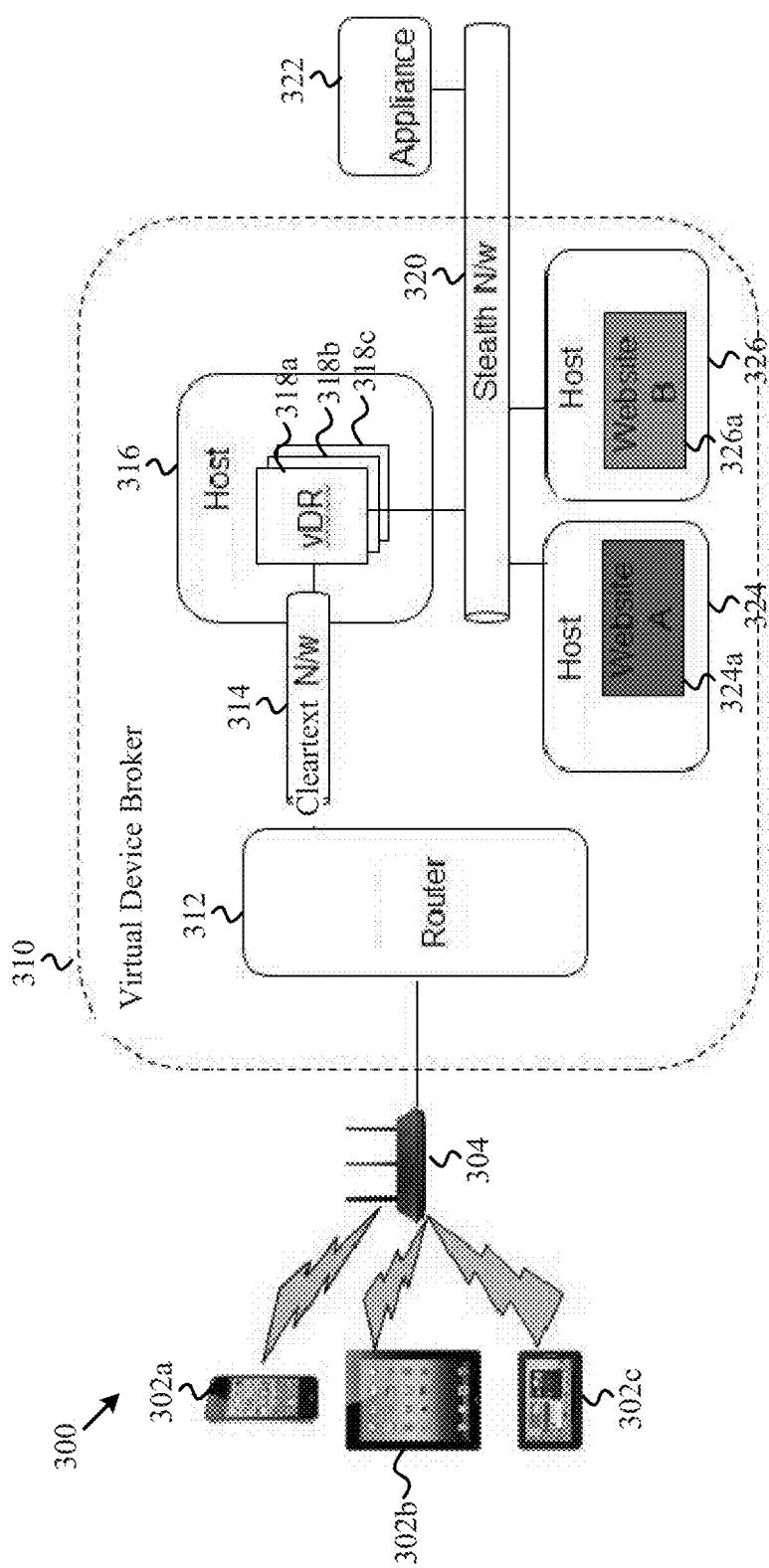
FIG. 3 is a block diagram illustrating a system for connecting a remote device to a shared network through a virtual device relay according to one embodiment of the disclosure.

FIG. 3 is a block diagram illustrating a system for connecting a remote device to a shared network through a virtual device relay according to one embodiment of the disclosure. A system 300 may include remote devices 302a-c, such as cellular phones, tablet computers, personal computers, and laptop computers. The remote devices 302a-c may be clients, such as the client 210 in FIG. 2, but are located remote from the bus 230. The remote devices 302a-c may connect to a router 304, such as a wireless router at a user's house or a Wi-Fi hotspot at a hotel, airport, or coffee shop.

A virtual device broker (vDB) 310 may execute on a server in a virtualized environment. The vDB 310 may be located remote from the devices 302a-c, such as within a server farm. Within the vDB 310, several virtual machines may execute to perform different tasks. For example, a router 312 may be virtualized within the vDB 310 to handle communication to and from virtual machines within the vDB 310. Communications between the vDB host 310 and the remote devices 302a-c may be virtual channel connections. The router 312 may be coupled to a network 314. The network 314 may have no security measures, such as when the network 314 is a clear-text network suitable for security-related deep-packet inspection. A host 316 may execute within the vDB 310 and be in communication with the network 314. The host 316 may execute one or more virtual device relays 318a-c. The virtual device relays 318a-c may be in communication with a shared network 320. The virtual device relays 318a-c may be virtual machines executing on the vDB 310, such as the virtual machines 208a-e of FIG. 2. The shared network 320 may connect the virtual device relays 318a-c to hosts 324 and 326, similar to the bus 230 providing communication between the virtual machines 208a-e of FIG. 2. The hosts 324 and 326 may be Linux hosts, or hosts executing other operating systems such as Windows.

Also in communication with the shared network 320 may be the hosts 324 and 326 executing within the vDB 310. The hosts 324 and 326 may also be virtual machines, such as the virtual machines 208a-e of FIG. 2. The hosts 324 and 326 may host websites 324a. and 326a, respectively. Each of the hosts 324 and 326 may be assigned to different communities-of-interest. That is, each of the hosts 324 and 326 may be owned by different tenants of the vDB 310. Each of the virtual device relays 318a-c may be assigned to different communities-of-interest, such as by provisioning each of the virtual device relays 318a-c with different encryption keys. Furthermore, an appliance 322, separate from the vDB 310, may be in communication with the shared network 320. The appliance 322 may also be assigned a community-of-interest.

The virtual device relays 318a-c may be assigned different community-of-interests to allow access to a remote device to particular hosts in communication with the shared network 320. For example, the remote device 302a may be allowed access to the host 324 through the virtual device relay 318a but not the host 326 by assigning a community-of-interest to the virtual device relay 318a that is shared by the host 324 and not the host 326.

According to one embodiment, one virtual device relay is instantiated for each of the remote hosts 302a-c. That is, the virtual device relay 318a may handle communications with the remote device 302a, the virtual device relay 318b may handle communications with the remote device 302b, and the virtual device relay 318c may handle communications with the remote device 302c. Each of the virtual device relays 318a-c may be assigned one or more community-of-interests, and a respective encryption key for each community-of-interest, to allow the remote devices 302a-c, respectively, access to particular appliances or virtual machines in communication with the shared network 320.

Figure 4:
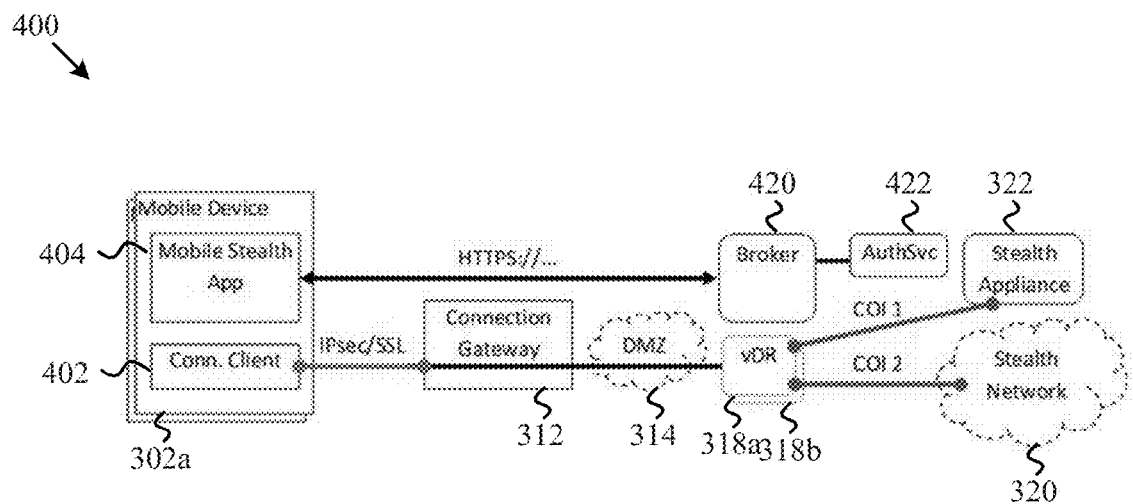
FIG. 4 is a block diagram illustrating an authorization system for authorization of a remote device for access to a shared network according to one embodiment.

FIG. 4 is a block diagram illustrating an authorization system for authorization of a remote device for access to a shared network according to one embodiment. The remote device 302a. may include software, such as a mobile stealth application 404 and a connection client 402. The mobile stealth application 404 may initiate a connection over a secure transfer protocol, such as secure hypertext transfer protocol (HTTPS) to a broker 420, which is in communication with an authorization service 422. The application 404 may register the user of the remote device 302a with an enterprise server, such as through the authorization service 422. The application 404 may receive user credentials from a user and transfer the credentials to the broker 420 for authorization by the authorization service 422. When authenticated, the application 404 may invoke connection client 402. The connection client 402 may establish communications with the router 312 through a tunnel, such as a virtual private network (VPN) tunnel. Through the connection client 402, the remote device 302a may gain access to the virtual device relays 318a-b that have access to the shared network 320 and/or the appliance 322. For example, the virtual device relay 318a may be started in a new virtual machine on a host to handle communications with the remote device 302a. When the application 404 receives authorizations from the broker 420, the application 404 may provide a session profile with connection parameters, such a username and password, to the connection client 402. The appliance 322 may be, for example, a VPN appliance that communicates with the shared network 320 through a VPN connection.

Figure 5:
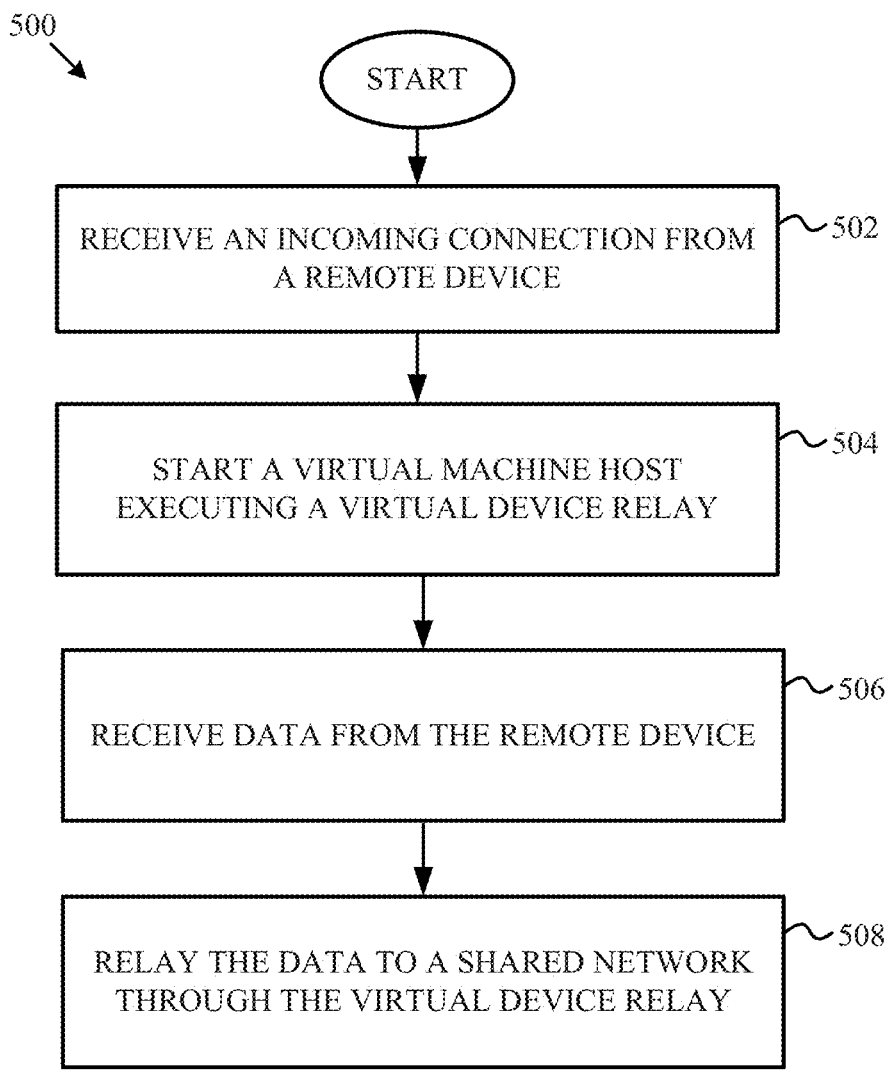
FIG. 5 is a flow chart illustrating a method of starting a virtual device relay on a host according to one embodiment of the disclosure.

FIG. 5 is a flow chart illustrating a method of starting a virtual device relay on a host according to one embodiment of the disclosure. A method 500 begins at block 502 with receiving an incoming connection from a remote device. At block 504, a virtual machine host is started on a server, and the virtual machine host executes a virtual device relay. At block 506, data is received from the remote device, such as through the connection application 402 of FIG. 2. The data travels through a router within the machine host to the virtual device relay. At block 508, the data is relayed to a shared network through the virtual device relay, such that the remote device has access to appliances and hosts on the shared. network having a community-of-interest in common with the virtual device relay.

Figure 6:
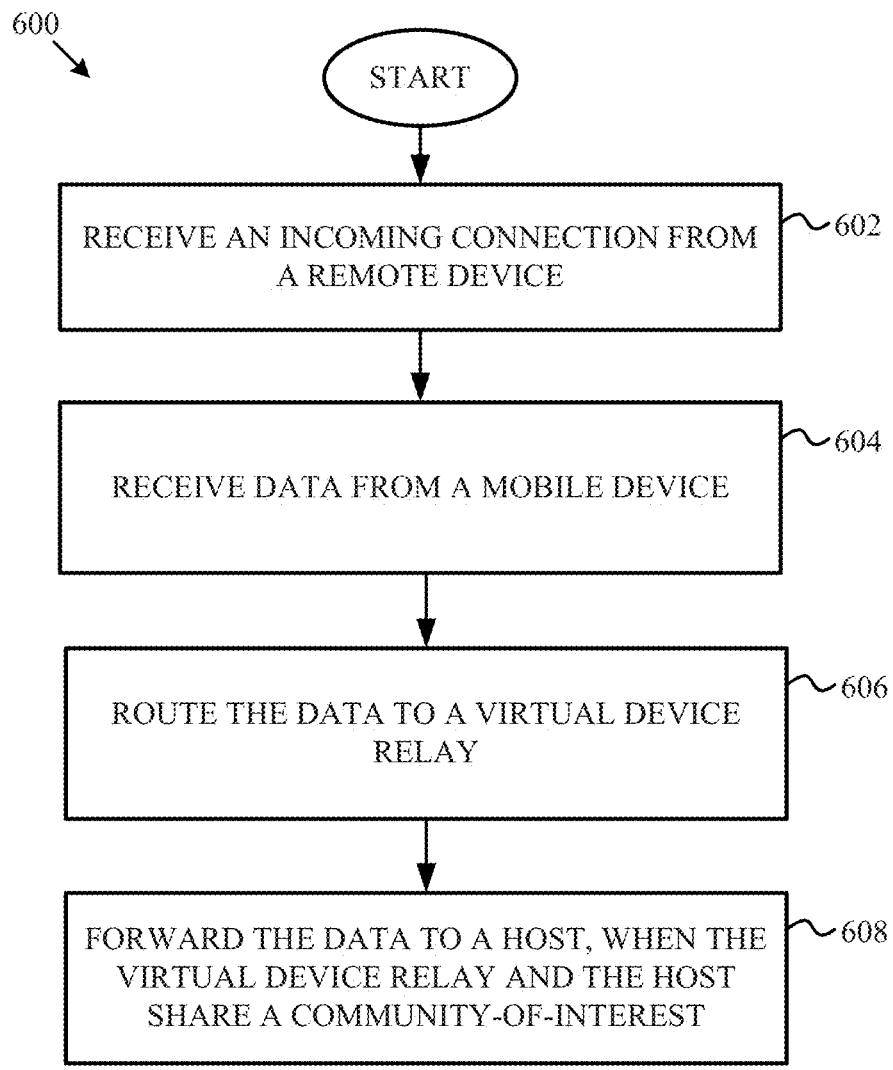
FIG. 6 is a flow chart illustrating a method providing access to a shared network to a remote device through a virtual device relay according to one embodiment of the disclosure.

FIG. 6 is a flow chart illustrating a method providing access to a shared network to a remote device through a virtual device relay according to one embodiment of the disclosure. A method 600 begins at block 602 with receiving an incoming connection from a remote device. The incoming connection may be received at a router and a virtual device relay may be started to handle communications with the remote device, At block 604, data is received from the remote device at the router. The destination of the data may be a device in communication with a shared network with the virtual device relay. At block 606, the data is routed to the virtual device relay. At block 608, the virtual device relay forwards the data to a host, when the virtual device relay and the host share a community-of-interest. That is, the remote device may only communicate with appliances and/or hosts on the shared network through the virtual device relay that are a member of the same community-of-interest as the virtual device relay. When devices are members of the same community-of-interest, the devices may have a common encryption key. The virtual device relay may have one or more assigned communities-of-interest to allow the remote device access to several different appliances or hosts on the shared network.

Figure 7:
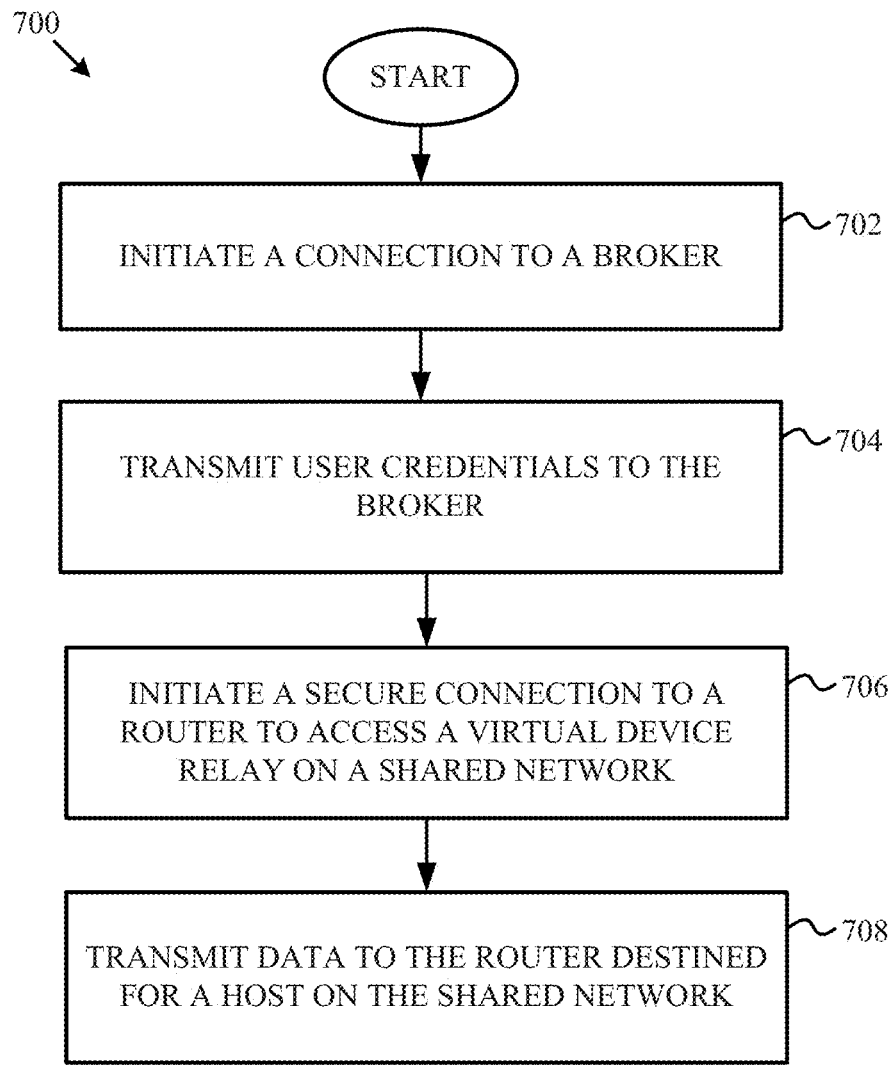
FIG. 7 is a flow chart illustrating a method of securing a connection between a remote device and a shared network according to one embodiment of the disclosure.

FIG. 7 is a flow chart illustrating a method of securing a connection between a remote device and a shared network according to one embodiment of the disclosure. A method 700 begins at block 702 with the remote device initiating a connection to a broker. The connection at block 702 between the remote device and the broker may be, for example, a secure hypertext transfer protocol (HTTPS) connection. At block 704, the remote device may transmit user credentials to the broker through the HTTPS connection. At block 706, the remote device may initiate a secure connection to a router to access a virtual device relay on a shared network. The secure connection at block 706 may be, for example, a virtual private network (VPN) connection encrypted with an IPsec protocol. According to one embodiment, the secure connection at block 706 is encrypted through a commercially-available connection protocol. At block 708, data is transmitted to the router destined for a host on the shared network. The data is forwarded to the virtual device relay by the router, where the virtual device relay may forward the data to the destination device on the shared network, if the virtual device relay and the destination device share a community-of-interest.

Figure 8:
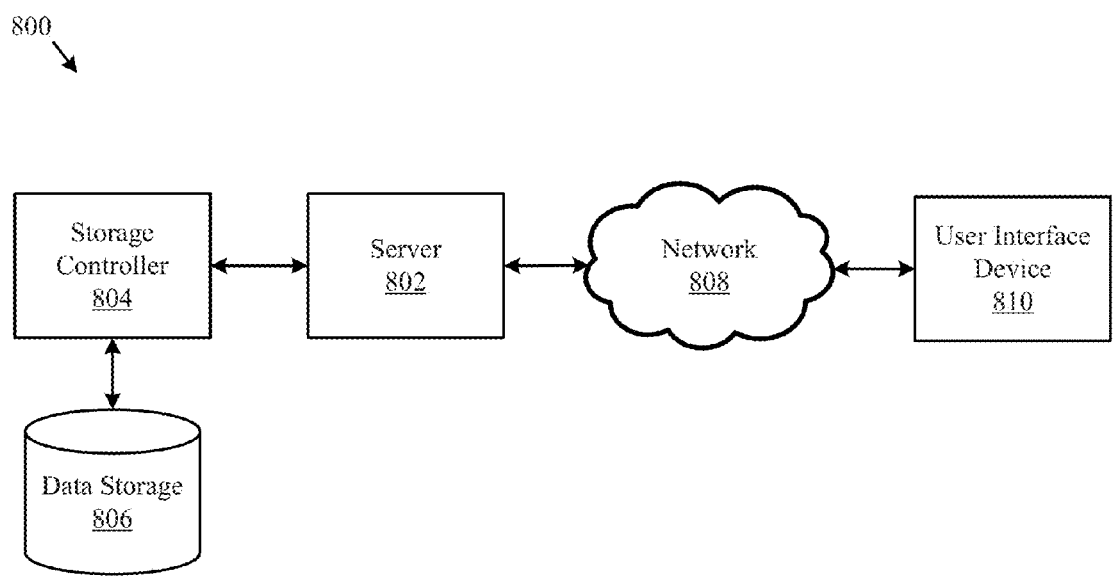
FIG. 8 is a block diagram illustrating a computer network according to one embodiment of the disclosure.

FIG. 8 illustrates one embodiment of a system 800 for an information system, which may host virtual machines. The system 800 may include a server 802, a data storage device 806, a network 808, and a user interface device 810. The server 802 may be a dedicated server or one server in a cloud computing system. The server 802 may also be a hypervisor-based system executing one or more guest partitions. The user interface device 810 may be, for example, a remote device operated by a tenant administrator or a remote device operated by a client. In a further embodiment, the system 800 may include a storage controller 804, or storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other a mobile communication device having access to the network 808. The user interface device 810 may be used to access a web service executing on the server 802. When the device 810 is a mobile device, sensors (not shown), such as a camera or accelerometer, may be embedded in the device 810. When the device 810 is a desktop computer the sensors may be embedded in an attachment (not shown) to the device 810. In a further embodiment, the user interface device 810 may access the Internet or other wide area or local area network to access a web application or web service hosted by the server 802 and provide a user interface for enabling a user to enter or receive information.

The network 808 may facilitate communications of data, such as dynamic license request messages, between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate server (not shown), For example, in a cloud application the user interface device 810 may access an application server. The application server may fulfill requests from the user interface device 810 by accessing a database management system (DBMS). in this embodiment, the user interface device 810 may be a computer or phone executing a Java application making requests to a JBOSS server executing on a Linux server, which fulfills the requests by accessing a relational database management system (RDMS) on a mainframe server.

Figure 9:
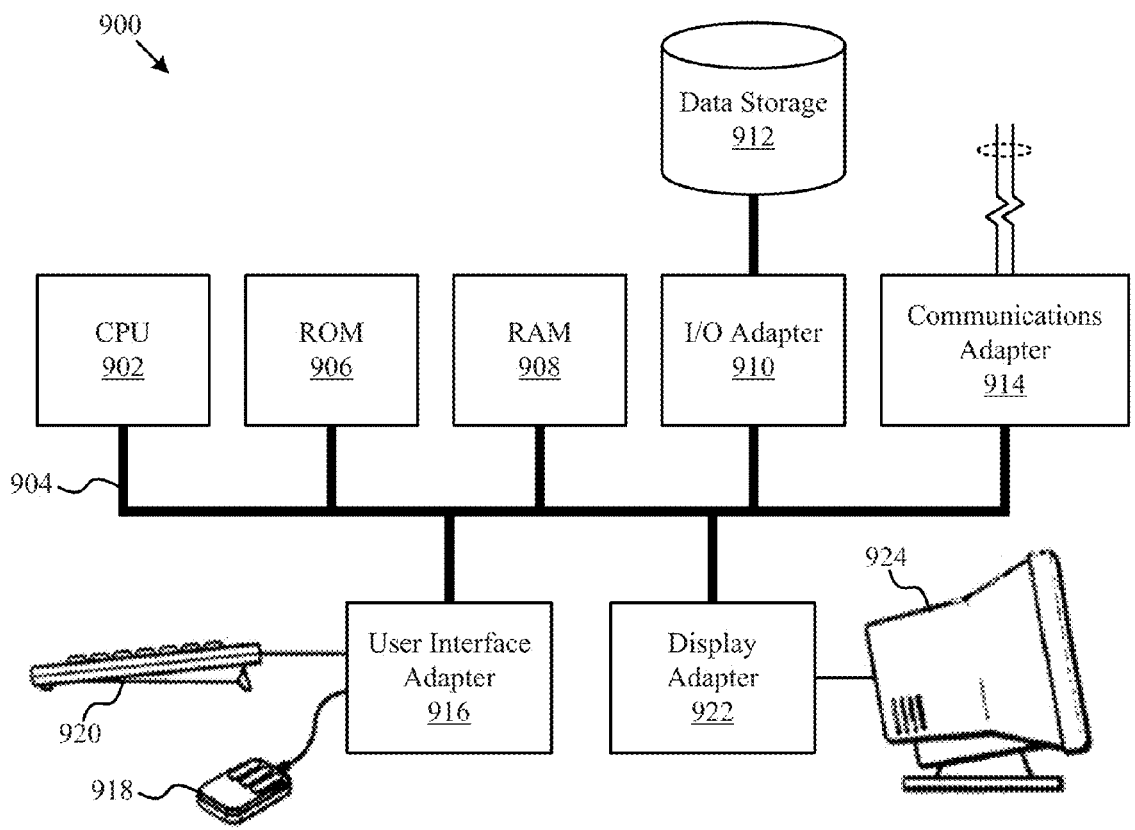
FIG. 9 is a block diagram illustrating a computer system according to one embodiment of the disclosure.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 also may include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROW 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an input/output (I/O) adapter 910, a communications adapter 914, a user interface adapter 916, and a display adapter 922. The I/O adapter 910 and/or the user interface adapter 916 may, in certain embodiments, enable a user to interact with the computer system 900. in a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The communications adapter 914 may also be adapted to couple the computer system 900 to other networks such as a global positioning system (GPS) or a Bluetooth network. The user interface adapter 916 couples user input devices, such as a keyboard 920, a pointing device 918, and/or a touch screen (not shown) to the computer system 900. The keyboard 920 may be an on-screen keyboard displayed on a touch panel. Additional devices (not shown) such as a camera, microphone, video camera, accelerometer, compass, and or gyroscope may be coupled to the user interface adapter 916. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of a server 802 and/or the user interface device 810. For example, any suitable processor-based device may be utilized including, without limitation, personal data assistants (RDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 10A:
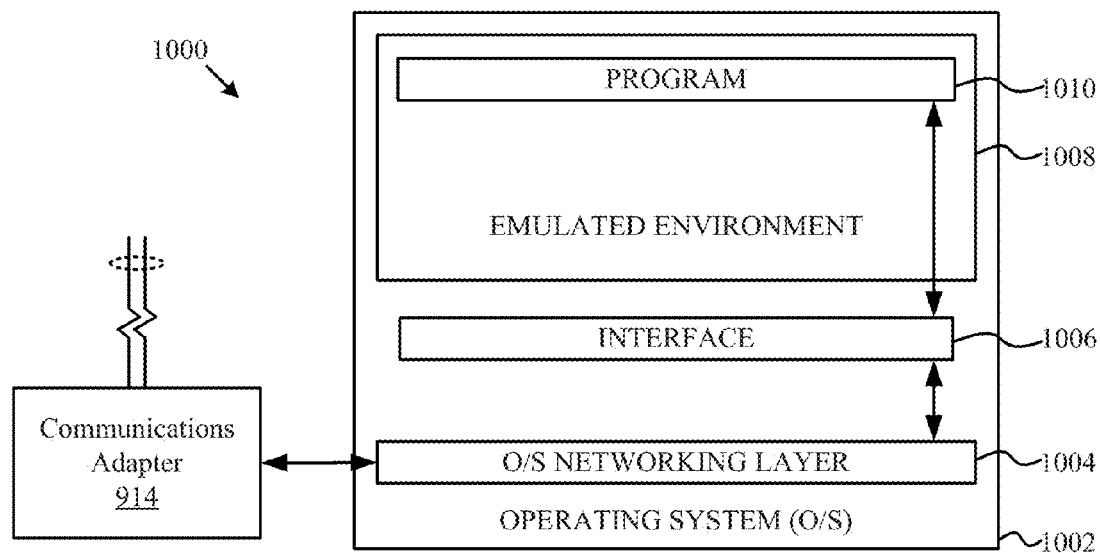
FIG. 10A is a block diagram illustrating a server hosting an emulated software environment for virtualization according to one embodiment of the disclosure.

FIG. 10A is a block diagram illustrating a server hosting an emulated software environment for virtualization according to one embodiment of the disclosure. An operating system 1002 executing on a server includes drivers for accessing hardware components, such as a networking layer 1004 for accessing the communications adapter 914. The operating system 1002 may be, for example, Linux. An emulated environment 1008 in the operating system 1002 executes a program 1010, such as CPCommOS. The program 1010 accesses the networking layer 1004 of the operating system 1002 through a non-emulated interface 1006, such as XNIOP. The non-emulated interface 1006 translates requests from the program 1010 executing in the emulated environment 1008 for the networking layer 1004 of the operating system 1002.

Figure 10B:
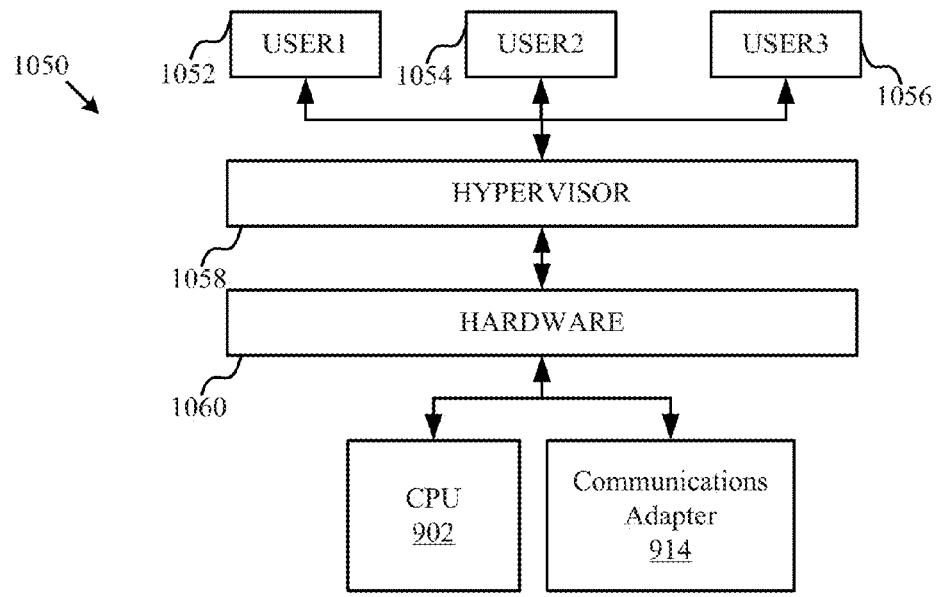
FIG. 10B is a block diagram illustrating a server hosting an emulated hardware environment according to one embodiment of the disclosure.

In another example, hardware in a computer system may be virtualized through a hypervisor. FIG. 10B is a block diagram illustrating a server hosting an emulated hardware environment according to one embodiment of the disclosure. Users 1052, 1054, 1056 may access the hardware 1060 through a hypervisor 1058. The hypervisor 1058 may be integrated with the hardware 1060 to provide virtualization of the hardware 1060 without an operating system, such as in the configuration illustrated in FIG. 10A. The hypervisor 1058 may provide access to the hardware 1060, including the CPU 902 and the communications adaptor 914.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   initiating, by a remote device, a secure connection to a router executing in a virtual machine of a server;
   transmitting, through the secure connection, data to the router designated for a host and/or appliance on a shared network with the router;
   routing the transmitted data from the router to a virtual device relay on the shared network; and
   forwarding the routed data from the virtual device relay to the designated host and/or appliance only when the designated host and/or appliance has the same administrator-assigned community-of-interest as the virtual device relay.

2. The method of claim 1, in which the step of initiating the secure connection comprises initiating a virtual private network (VPN) connection.

3. The method of claim 2, in which the step of transmitting the data comprises transmitting data over an IPsec connection.

4. The method of claim 1, further comprising initiating, by the remote device, a connection to a broker before initiating the connection to the router.

5. The method of claim 4, further comprises transmitting user credentials to the broker.

6. The method of claim 5, in which the user credentials are associated with the community-of-interest.

7. The method of claim 4, in which initiating the connection to the broker comprises initiating a secure hypertext transfer protocol (HTTPS).

8. A computer program product comprising:
   a non-transitory computer-readable medium comprising:
      code to initiate, by a remote device, a secure connection to a router executing in a virtual machine of a server;
      code to transmit, through the secure connection, data to the router designated for a host and/or appliance on a shared network with the router;
      code to route the transmitted data from the router to a virtual device relay on the shared network; and
      code to forward the routed data from the virtual device relay to the designated host and/or appliance only when the designated host and/or appliance has the same administrator-assigned community-of-interest as the virtual device relay.

9. The computer program product of claim 8, in which the medium further comprises code to initiate a virtual private network (VPN) connection.

10. The computer program product of claim 9, in which the medium further comprises code to transmit data over an IPsec connection.

11. The computer program product of claim 9, in which the medium further comprises code to initiate, by the remote device, a connection to a broker before initiating the connection to the router.

12. The computer program product of claim 11, in which the medium further comprises code to transmit user credentials to the broker.

13. The computer program product of claim 12, in which the user credentials are associated with the community-of-interest.

14. The computer program product of claim 11, in which the medium further comprises code to initiate a secure hypertext transfer protocol (HTTPS).

15. An apparatus, comprising:
   a memory;
   a processor coupled to the memory, in which the processor is configured:
      to initiate a secure connection to a router executing in a virtual machine of a server;
      to transmit, through the secure connection, data to the router designated for a host and/or appliance on a shared network with the router;
      to route the transmitted data from the router to a virtual device relay on the shared network; and
      to forward the routed data from the virtual device relay to the designated host and/or appliance only when the designated host and/or appliance has the same administrator-assigned community-of-interest as the virtual device relay.

16. The apparatus of claim 15, in which the processor is further configured to initiate a virtual private network (VPN) connection.

17. The apparatus of claim 16, in which the processor is further configured to transmit data over an IPsec connection.

18. The apparatus of claim 15, in which the processor is further configured to initiate a connection to a broker before initiating the connection to the router.

19. The apparatus of claim 15, in which the processor is further configured to transmit user credentials to the broker, in which the user credentials are associated with the community-of-interest.

20. The apparatus of claim 15, in which the processor is further configured to initiate a secure hypertext transfer protocol (HTTPS).

\* \* \* \* \*